No. 697,397. Patented Apr. 8, 1902.
J. E. CHURCH & G. W. REYNOLDS.
ADVERTISING DEVICE.
(Application filed Sept. 28, 1901.)

(No Model.)

Witnesses:
Wm. H. Varnum.
C. S. Miller.

Inventors:
James E. Church
George W. Reynolds
By Henry J. Miller
Atty

THE NORRIS PETERS CO., PHOTO-LITHO., WASHINGTON, D. C.

UNITED STATES PATENT OFFICE.

JAMES E. CHURCH AND GEORGE W. REYNOLDS, OF CAMBRIDGEPORT, MASSACHUSETTS.

ADVERTISING DEVICE.

SPECIFICATION forming part of Letters Patent No. 697,397, dated April 8, 1902.

Application filed September 28, 1901. Serial No. 76,929. (No model.)

*To all whom it may concern:*

Be it known that we, JAMES E. CHURCH and GEORGE W. REYNOLDS, citizens of the United States, residing at Cambridgeport, in the county of Middlesex and State of Massachusetts, have invented certain new and useful Improvements in Advertising Devices, of which the following is a specification, reference being had therein to the accompanying drawings.

This invention has reference to improvements in advertising devices.

The object of the invention is to provide an advertising device of novel construction whereby advertisements may be delivered apparently as photographs.

Another object of the invention is to provide an advertising device in the nature of a carrier resembling a photographic camera and adapted to contain a series of advertising cards or devices.

The invention consists in such novel features of construction and combination of parts, whereby the objects of the invention are carried into effect, as shall hereinafter be more fully described, and pointed out in the claim.

Figure 1:
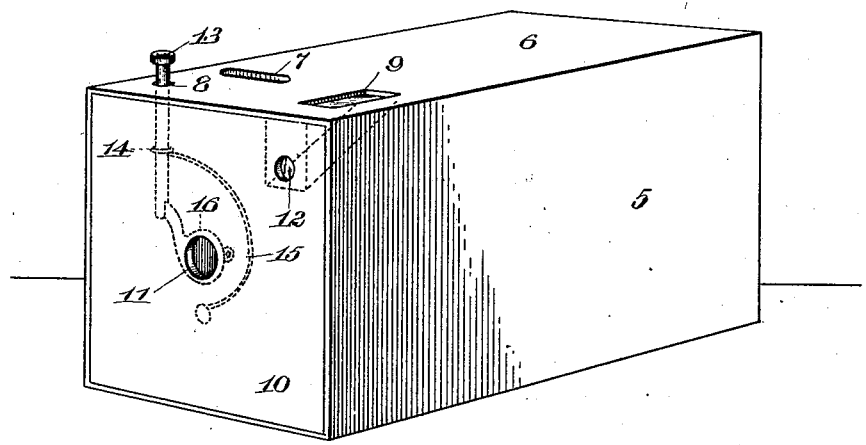
Figure 2:
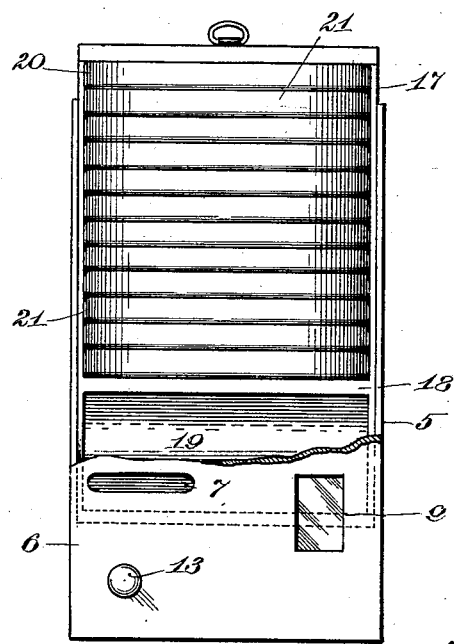

In the drawings, Figure 1 represents a perspective view of the improved advertising device. Fig. 2 represents a plan view of the same, portions of the outer case being broken away to show the construction of the sliding holder.

Similar numbers of references designate corresponding parts throughout.

In carrying this invention into practice our object has been to provide a carrier for a series of advertising cards or devices, this carrier having a near resemblance to a photographic camera, and the removable advertising devices being designed to, in a sense, carry out the illusion of the delivery of a photographic picture taken by the camera.

In the drawings, 5 represents a rectangular box or case open at one end and having in its top 6 the coin-slot 7, the perforation 8, and the view-finder opening 9. The closed end 10 of the case has the central perforation 11 and the view-finding perforation 12. Back of the perforation 12 may be placed a view-finder of any well-known construction. Through the perforation 8 works the stem of the presser-button 13, which also works through the guide 14 in the back of the end 10 and is lifted by the spring 15, secured to such end, or by any other simple spring. To the back of the end 10 may be pivoted, if desired, a shutter, as 16, which has an extension operatively connected with the stem of the presser-button 13.

Within the case 5 slides the holder 17 of any well known construction suitable for its purposes and being divided by the partition 18 into the coin-receptacle 19 and the compartment 20. When this holder 17 is pushed fully into place, the coin-receptacle 19 is located beneath the coin-slot 7, the compartment 20 or its equivalent being designed to removably contain a series of advertising cards or devices 21 21. These advertising devices 21 21 are preferably small mirrors having advertisements applied or attached thereto. Any other devices designed to maintain for a while the illusion of the delivery of a picture supposedly made in the camera may, however, be substituted for the mirrors—as, for instance, printed or embossed pictures or their equivalents.

The device is designed for use by children as a toy. The operator first presents the camera to the supposed subject, who deposits a small coin in the slot 7. The operator then turns the end 10 toward the subject, pretends to locate the subject by means of the view-finder, and then presses the button 13, thus apparently opening the shutter to expose the sensitized plate or film supposedly contained within the case. The operator then opens the holder 17 and delivers one of the mirrors or other objects contained therein to the supposed subject, thus distributing the advertisements.

It is evident that the articles 21 may be supported and carried by any well-known equivalent for the compartment or box.

Having thus described our invention, we claim as new and desire to secure by Letters Patent—

The combination with the case 5 having the top 6 with its slot 7 and perforation 8, and furnished with the end 10 having the opening 11, and the spring-operated button 13 working through the perforation 8, of the holder 17 having the compartments 19 and 20, and the mirrors 21 21, or their equivalents, contained in the compartment 20, as and for the purpose described.

In testimony whereof we affix our signatures in presence of two witnesses.

JAMES E. CHURCH.
GEORGE W. REYNOLDS.

Witnesses:
WALDO F. SUTCLIFFE,
CHARLES F. WETHINGTON.